(12) United States Patent
Hino et al.

(10) Patent No.: US 11,254,843 B2
(45) Date of Patent: Feb. 22, 2022

(54) ADHESIVE FILM

(71) Applicant: DOW TORAY CO., LTD., Tokyo (JP)

(72) Inventors: Takakazu Hino, Ichihara (JP); Akihiro Nakamura, Ichihara (JP); Michitaka Suto, Ichihara (JP); Hidefumi Tanaka, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 64 days.

(21) Appl. No.: 16/971,700

(22) PCT Filed: Jan. 22, 2019

(86) PCT No.: PCT/JP2019/001927
§ 371 (c)(1),
(2) Date: Aug. 21, 2020

(87) PCT Pub. No.: WO2019/167479
PCT Pub. Date: Sep. 6, 2019

(65) Prior Publication Data
US 2021/0363389 A1    Nov. 25, 2021

(30) Foreign Application Priority Data

Feb. 28, 2018  (JP) .............................. JP2018-035706
Mar. 12, 2018  (JP) .............................. JP2018-043856

(51) Int. Cl.
*C09J 7/38*    (2018.01)
*C09J 7/25*    (2018.01)

(52) U.S. Cl.
CPC ................. *C09J 7/38* (2018.01); *C09J 7/255* (2018.01); *C09J 2301/122* (2020.08);
(Continued)

(58) Field of Classification Search
CPC ........ C09J 7/38; C09J 7/255; C09J 2301/122; C09J 2467/006; C09J 2483/00; Y10T 428/24967
See application file for complete search history.

(56) References Cited

U.S. PATENT DOCUMENTS 5,466,532 A    11/1995    Wengrovius et al.
2003/0211317 A1    11/2003    Sheridan et al.
(Continued)

FOREIGN PATENT DOCUMENTS

CN    102399528 A    4/2012
CN    103619981 A    3/2014
(Continued)

OTHER PUBLICATIONS

English translation of International Search Report for PCT/JP2019/001927 dated Apr. 16, 2019, 2 pages.
(Continued)

*Primary Examiner* — Frank J Vineis
*Assistant Examiner* — Donald M Flores, Jr.
(74) *Attorney, Agent, or Firm* — Warner Norcross + Judd LLP

(57) ABSTRACT

Disclosed is an adhesive film. The adhesive film has a silicone adhesive layer on one surface or both surfaces of a substrate film. A silicone adhesive material is used to form the silicone adhesive layer. The silicone adhesive material has 120 to 380% of an elongation at break (tensile speed of 300 mm/min, temperature of 25° C.) specified in JIS K 6251, and $1.8 \times 10^5$ to $4.5 \times 10^5$ Pa of a shear storage modulus (frequency of 10 Hz, temperature of 25° C.). The adhesive film generally has good wettability to the surface of an adherend and in general can be easily attached without creating air bubbles, to the extent that, even if air bubbles are created, the air bubbles can be easily dissipated. Further, (Continued)

even though the adhesive film is generally not easily peeled, peeling is generally possible with a small adhesive force during high speed peeling.

6 Claims, 1 Drawing Sheet

(52) U.S. Cl.
 CPC ...... *C09J 2467/006* (2013.01); *C09J 2483/00* (2013.01); *Y10T 428/24967* (2015.01)

(56) References Cited

U.S. PATENT DOCUMENTS

| | | |
|---|---|---|
| 2004/0122142 A1 | 6/2004 | Meguriya |
| 2006/0094834 A1* | 5/2006 | Aoki .......................... C09J 7/38 525/478 |
| 2011/0111217 A1 | 5/2011 | Kuroda et al. |
| 2012/0045635 A1 | 2/2012 | Aoki |
| 2016/0009865 A1 | 1/2016 | Jiang et al. |

FOREIGN PATENT DOCUMENTS

| | | |
|---|---|---|
| CN | 104946144 A | 9/2015 |
| JP | H0598240 A | 4/1993 |
| JP | 2004502858 A | 1/2004 |
| JP | 2004189945 A | 7/2004 |
| JP | 2006152266 A | 6/2006 |
| JP | 2011102336 A | 5/2011 |
| JP | 2016506992 A | 3/2016 |
| JP | 2016169319 A | 9/2016 |
| WO | 2013103330 A2 | 7/2013 |

OTHER PUBLICATIONS

Machine assisted English translation of JP2016169319A obtained from https://patents.google.com/patent on Aug. 19, 2020, 19 pages.
Machine assisted English translation of CN104946144A obtained from https://patents.google.com/patent on Sep. 7, 2021, 10 pages.

* cited by examiner

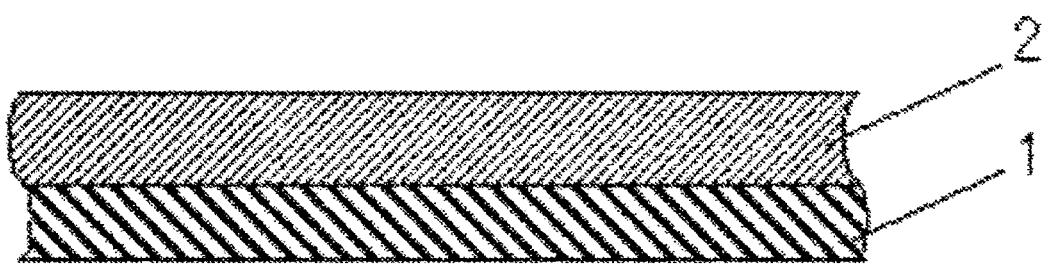

ADHESIVE FILM

CROSS-REFERENCE TO RELATED APPLICATIONS

This application is the National Stage of International Appl. No. PCT/JP2019/001927 filed on 22 Jan. 2019, which claims priority to and all advantages of Japanese Appl. No. 2018-035706 filed on 28 Feb. 2018 and Japanese Appl. No. 2018-043856 filed on 12 Mar. 2018, the contents of which are hereby incorporated by reference.

TECHNICAL FIELD

The present invention relates to an adhesive film having a silicone adhesive layer.

BACKGROUND ART

An adhesive film having a silicone adhesive layer on one surface or both surfaces of a substrate film is used for the purpose of scratch prevention, stain prevention, fingerprint adhesion prevention, static prevention, reflection prevention, glare prevention, peep prevention, etc. of the surfaces of CRT displays, liquid crystal displays, plasma displays, organic EL displays, inorganic EL displays, LED displays, surface electrolytic displays (SED), field emitting displays (FED), and touch panels utilizing these displays, etc.

Such an adhesive film has good wettability to the surface of an adherend and can be easily attached without creating air bubbles, to the extent that, even if air bubbles are created, the air bubbles are required to be easily dissipated (see Patent Documents 1 to 3).

Such an adhesive film has typically been required to not be easily peeled from the attached adherend, but rather has been required to be capable of being peeled from the adherend with a small adhesive force if necessary. Unfortunately, with such an adhesive film, problematically, if the wettability to the surface of the adherend is improved, the adhesive force during high speed peeling increases; in contrast, if the adhesive force is reduced, the wettability decreases.

PRIOR ART DOCUMENTS

Patent Documents

Patent Document 1: Japanese Unexamined Patent Application Publication No. 2006-152266
Patent Document 2: Japanese Unexamined Patent Application Publication No. 2011-102336
Patent Document 3: Japanese Unexamined Patent Application Publication No. 2016-169319

SUMMARY OF THE INVENTION

Problems to be Solved by the Invention

An object of the present invention is to provide an adhesive film which has good wettability to the surface of an adherend and can be easily attached without creating air bubbles, to the extent that, even if air bubbles are created, the air bubbles can be easily dissipated, and further, even though the adhesive film is generally not easily peeled, peeling is possible with a small adhesive force during high speed peeling.

Means for Solving the Problems

The adhesive film according to the present invention has a silicone adhesive layer on one surface or both surfaces of a substrate film, wherein a silicone adhesive material forming the silicone adhesive layer has 120 to 380% of an elongation at break (tensile speed of 300 mm/min, temperature of 25° C.) specified in JIS K 6251, and $1.8 \times 10^5$ to $4.5 \times 10^5$ Pa of a shear storage modulus (frequency of 10 Hz, temperature of 25° C.).

In the present adhesive film, a thickness of the silicone adhesive layer is preferably within a range of 5 µm to 1000 µm.

The present adhesive film preferably has 20 mN/25 mm to 60 mN/25 mm of a 180° peeling adhesive force (peeling speed of 6 m/min, temperature of 25° C.) to a mirror surface stainless steel plate specified in JIS Z 0237, when the substrate film is a PET film with a thickness of 50 µm and the thickness of the silicone adhesive layer is 40 µm.

In the present adhesive film, a silicone adhesive forming a silicone adhesive layer preferably comprises:

(A) 100 parts by mass of an organopolysiloxane consisting of (A1) 100 to 80 mass % of a diorganopolysiloxane having at least two alkenyl groups per molecule and (A2) 0 to 20 mass % of an organopolysiloxane containing a siloxane unit represented by the formula: $R^1_3SiO_{1/2}$ and a siloxane unit represented by the formula: $SiO_{4/2}$, wherein a molar ratio of the siloxane unit represented by the formula: $R^1_3SiO_{1/2}$ to the siloxane unit represented by the formula: $SiO_{4/2}$ is 0.5 to 1.7, and wherein $R^1$ is the same or different unsubstituted or halogen substituted monovalent hydrocarbon group having 1 to 12 carbon atoms;

(B) an organohydrogenpolysiloxane having at least two silicon atom-bonded hydrogen atoms per molecule, in an amount such that the silicon atom-bonded hydrogen atoms are 0.5 to 20 mols with respect to 1 mol of the alkenyl groups in component (A); and (C) a catalytic amount of a hydrosilylation reaction catalyst.

Effects of the Invention

The adhesive film according to the present invention has good wettability to the surface of an adherend and can be easily attached without creating air bubbles, to the extent that, even if air bubbles are created, the air bubbles can be easily dissipated, and further, even though the adhesive film is generally not easily peeled, peeling is possible with a small adhesive force during high speed peeling.

BRIEF DESCRIPTION OF THE DRAWINGS

FIG. 1 is a cross sectional view of an adhesive film according to the present invention.

MODE FOR CARRYING OUT THE INVENTION

The adhesive film according to the present invention is an adhesive film having a silicone adhesive layer on one surface or both surfaces of a substrate film.

While not limited thereto, exemplary substrate films include: plastic films consisting of polyester, poly(meth) acrylate, polycarbonate, polyethylene, polypropylene, polystyrene, polyamide, polyimide, polyphenylene sulfide, polytetrafluoroethylene, polyvinyl chloride, polyurethane, triacetylcellulose, polyacetal, norbornene based resin, cycloolefin based resin, epoxy resin, phenol resin, etc.; and composite films obtained using a plurality of these films. In particular, the substrate films are preferably polyester films such as polyethylene terephthalate, polybutylene terephthalate, and polyethylene naphthalate; polyacrylate films such as polyimide films, polyacrylate, and polymethacrylate; or polycarbonate films.

While not limited thereto, a thickness of the substrate film is preferably within a range of 5 to 300 μm or within a range of 10 to 150 μm.

In order to improve adhesion between the substrate film and the silicone adhesive layer, the surface of the substrate film may be subjected to primer treatment, corona treatment, etching treatment, plasma treatment, or sandblast treatment in advance.

If the silicone adhesive layer is on one surface of the substrate film, the surface opposite the surface of the silicone adhesive layer of the substrate film may be subjected to surface treatment such as scratch prevention, stain prevention, fingerprint adhesion prevention, glare prevention, reflection prevention, static prevention, and releasability imparting. Exemplary scratch prevention treatments (hard coating treatments) include treatments with hard coating agents such as an acrylate base, silicone base, oxetane base, inorganic base, and organic-inorganic hybrid base. Exemplary dirt prevention treatments include treatments with dirt prevention treatment agents such as a fluorine base, silicone base, ceramic base, and photocatalyst base. Exemplary reflection prevention treatments include wet treatment involving coating reflection prevention agents such as a fluorine base and silicone base, along with dry treatment by vapor deposition and sputtering. Further, exemplary static prevention treatments include treatments with antistatic agents such as a surfactant base, silicone base, organic boron base, conductive polymer base, metal oxide base, and vapor deposition metal base. Moreover, exemplary releasability imparting treatments include treatments with release treatment agents such as a silicone base and fluorine base.

Moreover, a polarizing film and color filter are used as the substrate film to allow the adhesive film to have optical functions.

In contrast, while not limited thereto, exemplary silicone adhesives forming the silicone adhesive layer include a hydrosilylation reaction curing silicone adhesive, organic peroxide curing silicone adhesive, or condensation reaction curing silicone adhesive, with a hydrosilylation reaction curing silicone adhesive preferable because it generates no byproduct upon curing.

Such a silicone adhesive preferably comprises:
(A) 100 parts by mass of an organopolysiloxane consisting of (A1) 100 to 80 mass % of a diorganopolysiloxane having at least two alkenyl groups per molecule and (A2) 0 to 20 mass % of an organopolysiloxane containing a siloxane unit represented by the formula: $R^1_3SiO_{1/2}$ and a siloxane unit represented by the formula: $SiO_{4/2}$, wherein a molar ratio of the siloxane unit represented by the formula: $R^1_3SiO_{1/2}$ to the siloxane unit represented by the formula: $SiO_{4/2}$ is 0.5 to 1.7, and wherein $R^1$ is the same or different unsubstituted or halogen substituted monovalent hydrocarbon group having 1 to 12 carbon atoms;
(B) an organohydrogenpolysiloxane having at least two silicon atom-bonded hydrogen atoms per molecule, in an amount such that the silicon atom-bonded hydrogen atoms are 0.5 to 20 mols with respect to 1 mol of the alkenyl groups in component (A); and
(C) a catalytic amount of a hydrosilylation reaction catalyst.

Component (A1) is an organopolysiloxane having at least two alkenyl groups per molecule. Exemplary alkenyl groups in component (A1) include alkenyl groups having 2 to 12 carbon atoms, such as vinyl groups, allyl groups, butenyl groups, pentenyl groups, hexenyl groups, heptenyl groups, octenyl groups, pentenyl groups, undecenyl groups, and dodecenyl groups, with vinyl groups and hexenyl groups preferable. While the bonding position of the alkenyl group is not limited, for example, the alkenyl group may be bonded to silicon atoms at a terminal of a molecular chain and/or silicon atoms in a molecular chain, with silicon atoms at a terminal of a molecular chain preferable. Exemplary organic groups that are bonded to silicon atoms other than alkenyl groups in component (A1) include: alkyl groups having 1 to 12 carbon atoms, such as methyl groups, ethyl groups, propyl groups, isopropyl groups, butyl groups, isobutyl groups, pentyl groups, isopentyl groups, neopentyl groups, heptyl groups, octyl groups, nonyl groups, decyl groups, undecyl groups, and dodecyl groups; aryl groups having 6 to 12 carbon atoms, such as phenyl groups, tolyl groups, and xylyl groups; aralkyl groups having 6 to 12 carbon atoms, such as benzyl groups and phenethyl groups; and halogenated alkyl groups having 1 to 12 carbon atoms, such as chloromethyl groups, 3-chloropropyl groups, and 3,3,3-trifluoropropyl groups, with methyl groups and phenyl groups preferable. Moreover, a molecular structure of component (A1) is a chain structure, with specific examples thereof including a linear structure, a partially branched linear structure, or a branched structure, with a linear structure preferable.

Exemplary components (A1) include: a dimethylpolysiloxane end-blocked at both molecular chain terminals with dimethylvinylsiloxy groups, dimethylpolysiloxane end-blocked at both molecular chain terminals with hexenyldimethylsiloxy groups, dimethylpolysiloxane end-blocked at both molecular chain terminals with diphenylvinylsiloxy groups, dimethylsiloxane-methylphenylsiloxane copolymer end-blocked at both molecular chain terminals with dimethylvinylsiloxy groups, dimethylsiloxane-diphenylsiloxane copolymer end-blocked at both molecular chain terminals with dimethylvinylsiloxy groups, dimethylsiloxane-methylphenylsiloxane copolymer end-blocked at both molecular chain terminals with diphenylvinylsiloxy groups, dimethylsiloxane-methylvinylsiloxane copolymer end-blocked at both molecular chain terminals with dimethylvinylsiloxy groups, dimethylsiloxane-methylphenylsiloxane-methylvinylsiloxane copolymer end-blocked at both molecular chain terminals with dimethylvinylsiloxy groups, dimethylsiloxane-diphenylsiloxane-methylvinylsiloxane copolymer end-blocked at both molecular chain terminals with dimethylvinylsiloxy groups, methylvinylpolysiloxane end-blocked at both molecular chain terminals with trimethylsiloxy groups, dimethylsiloxane-hexenylmethylsiloxane copolymer end-blocked at both molecular chain terminals with trimethylsiloxy groups, methylvinylsiloxane-methylphenylsiloxane copolymer end-blocked at both molecular chain terminals with trimethylsiloxy groups, methylvinylsiloxane-diphenylsiloxane copolymer end-blocked at both molecular chain terminals with trimethylsiloxy groups, dimethylsiloxane-methylvinylsiloxane copolymer end-blocked at both molecular chain terminals with trimethylsiloxy groups, dimethylpolysiloxane-methylvinylsiloxane copolymer end-blocked at both molecular chain terminals with dimethylhexenylsiloxy groups, dimethylsiloxane-methylhexenylsiloxane copolymer end-blocked at both molecular chain terminals with dimethylhexenylsiloxy groups, dimethylvinylsiloxy group-terminated poly(dimethylsiloxane-methylsilsesquioxane) copolymer, dimethylvinylsiloxy group-terminated poly(dimethylsiloxane-methylvinylsiloxane-methylsilsesquioxane) copolymer, trimethylsiloxy group-terminated poly(dimethylsiloxane-methylvinylsiloxane-methylsilsesquioxane) copolymer, hexenyldimethylsiloxy group-terminated poly(dimethylsiloxane-monomethylsilsesquioxane) copolymer, hexenyldimethylsiloxy group-terminated poly(dimethylsiloxane-hexenylmethylsiloxane-methylsilsesquioxane) copolymer, trimethylsiloxy group-terminated poly(dimethylsiloxane-hexenylmethylsiloxane-methylsilsesquioxane) copolymer, dimethylvinylsiloxy group-terminated poly(dimethylsiloxane-silicate) copolymer, hexenyldimethylsiloxy group-terminated poly(dimethylsiloxane-silicate) copolymer, trimethylsiloxy group-terminated poly(dimethylsiloxane-methylvinylsiloxane-silicate) copolymer, trimethylsiloxy group-terminated poly(dimethylsiloxane-hexenylmethylsiloxane-silicate) copolymer, trimethylsiloxy group-dimethylvinylsiloxy group-mixed terminated poly(dimethylsiloxane-silicate) copolymer, trimethylsiloxy group-hexenyldimethylsiloxy group-mixed terminated poly (dimethylsiloxane-silicate) copolymer, trimethylsiloxy group-dimethylvinylsiloxy group-mixed terminated poly(dimethylsiloxane-methylvinylsiloxane-silicate) copolymer, trimethylsiloxy group-hexenyldimethylsiloxy group-mixed terminated poly(dimethylsiloxane-hexenylmethylsiloxane-silicate) copolymer, and mixtures of two or more of these organopolysiloxanes.

While not limited thereto, a viscosity of such component (A1) at 25° C. is preferably 10 mPa·s or more and 100,000 mPa·s or less, or 100 mPa·s or more and 50,000 mPa·s or less. This is because, if the viscosity of component (A1) is the lower limit of the abovementioned range or more, sufficient adhesive force can be obtained; in contrast, if the viscosity is the upper limit of the abovementioned range or less, any increase in the adhesive force during high speed peeling is suppressed. Note that the viscosity of component (A1) at 25° C. can be measured by a rotational viscometer in accordance with JIS K7117-1.

Component (A2) is an organopolysiloxane which has a siloxane unit represented by the formula: $R^1_3SiO_{1/2}$ and a siloxane unit represented by the formula: $SiO_{4/2}$, wherein a molar ratio of the siloxane unit represented by the formula: $R^1_3SiO_{1/2}$ to the siloxane unit represented by the formula: $SiO_{4/2}$ is within a range 0.5 to 1.7, wherein this molar ratio is preferably within a range of 0.5 to 1.5 or within a range of 0.6 to 1.5. This is because, if this molar ratio is within the abovementioned range, the adhesive force and retention force of the obtained silicone adhesive layer are larger.

In the formula, $R^1$ is the same or different unsubstituted or halogen-substituted monovalent hydrocarbon group having 1 to 12 carbon atoms, with specific examples thereof including alkyl groups having 1 to 12 carbon atoms, such as methyl groups, ethyl groups, propyl groups, isopropyl groups, butyl groups, isobutyl groups, pentyl groups, isopentyl groups, neopentyl groups, heptyl groups, octyl groups, nonyl groups, decyl groups, undecyl groups, and dodecyl groups; alkenyl groups having 2 to 12 carbon atoms, such as vinyl groups, allyl groups, butenyl groups, pentenyl groups, hexenyl groups, heptenyl groups, octenyl groups, pentenyl groups, undecenyl groups, and dodecenyl groups; aryl groups having 6 to 12 carbon atoms, such as phenyl groups, tolyl groups, and xylyl groups; aralkyl groups having 6 to 12 carbon atoms, such as benzyl groups and phenethyl groups; and halogenated alkyl groups having 1 to 12 carbon atoms, such as chloromethyl groups, 3-chloropropyl groups, and 3,3,3-trifluoropropyl groups, with methyl groups, vinyl groups, and phenyl groups preferable.

Moreover, silicon atoms in component (A2) may have hydroxyl groups or hydrolyzable groups in addition to the abovementioned monovalent hydrocarbon groups. Exemplary hydrolyzable groups include alkoxy groups having 1 to 3 carbon atoms, such as methoxy groups, ethoxy groups, and propoxy groups; acetoxy groups; and isopropenoxy groups. If component (A2) has silicon atom-bonded hydroxyl groups, while a content thereof is not limited, it is preferably within the range of 0.01 to 4.0 mass %.

A content of component (A2) is 0 mass % or more and 20 mass % or less in component (A). This is because, if the content of component (A2) is the upper limit of the abovementioned range or less, the adhesive force of the obtained silicone adhesive layer is smaller.

Note that if component (A2) is in a solid state at 25° C. and it is difficult to uniformly mix component (A2) in the present composition, such can be resolved by preparing an organic solution of component (A2) in advance, and mixing the same with a portion or all of components (A1) or (B), after which the used organic solvent can be removed from this mixture. Note that the organic solvent which can be used to prepare the organic solution of component (A2) can be used as long as it is able to dissolve component (A2) and can be easily removed. While not limited thereto, specific examples thereof include: aromatic hydrocarbons such as toluene and xylene; and aliphatic hydrocarbons such as hexane and heptane.

In the abovementioned composition, because the wettability to the surface of an adherend is good and the silicone adhesive layer which is peeled by small adhesive force during high speed peeling is formed, a content of alkenyl groups in component (A) is preferably within a range of 0.30 to 0.60 mass %, within a range of 0.35 to 0.55 mass %, or within a range of 0.40 to 0.50 mass %.

Component (B) is an organopolysiloxane having at least two silicon atom-bonded hydrogen atoms per molecule. Exemplary groups bonded to silicon atoms other than hydrogen atoms in component (B) include unsubstituted or halogen-substituted monovalent hydrocarbon groups which have no aliphatic unsaturated carbon-carbon bond and have 1 to 12 carbon atoms, with specific examples thereof including: alkyl groups having 1 to 12 carbon atoms, such as methyl groups, ethyl groups, propyl groups, isopropyl groups, butyl groups, isobutyl groups, pentyl groups, isopentyl groups, neopentyl groups, heptyl, octyl groups, nonyl groups, decyl groups, undecyl groups, and dodecyl groups; aryl groups having 6 to 12 carbon atoms, such as phenyl groups, tolyl groups, and xylyl groups; aralkyl groups having 6 to 12 carbon atoms, such as benzyl groups and phenethyl groups; and halogenated alkyl groups having 1 to 12 carbon atoms, such as chloromethyl groups, 3-chloropropyl groups, and 3,3,3-trifluoropropyl groups, with methyl groups and phenyl groups preferable.

A molecular structure of component (B) is not limited. Examples thereof include a linear structure, a partially branched linear structure, a branched structure, a cyclic structure, a network structure, and a resinous structure, with a linear structure or a partially branched linear structure preferable.

Exemplary components (B) include a methylhydrogenpolysiloxane end-blocked at both molecular chain terminals with trimethylsiloxy groups, dimethylsiloxane-methylhydrogensiloxane copolymer end-blocked at both molecular chain terminals with trimethylsiloxy groups, dimethylsiloxane-methylhydrogensiloxane-methylphenylsiloxane copolymer end-blocked at both molecular chain terminals with trimethylsiloxy groups, dimethylsiloxane-methylhydrogensiloxane copolymer end-blocked at both molecular chain terminals with dimethylhydrogensiloxy groups, dimethylsiloxane-methylphenylsiloxane-methylhydrogensiloxane copolymer end-blocked at both molecular chain terminals with dimethylhydrogensiloxy groups, methylphenylsiloxane-methylhydrogensiloxane copolymer end-blocked at both molecular chain terminals with dimethylhydrogensiloxy groups, an organopolysiloxane resin consisting of a siloxane unit represented by the formula: $R^2{}_3SiO_{1/2}$, a siloxane unit represented by the formula; $R^2{}_2HSiO_{1/2}$, and a siloxane unit represented by the formula: $SiO_{4/2}$, an organopolysiloxane resin consisting of a siloxane unit represented by the formula: $R^2{}_2HSiO_{1/2}$ and a siloxane unit represented by the formula: $SiO_{4/2}$, an organopolysiloxane resin consisting of a siloxane unit represented by the formula: $R^2HSiO_{2/2}$ and a siloxane unit represented by the formula: $R^2SiO_{3/2}$ or a siloxane unit represented by the formula: $HSiO_{3/2}$, and mixtures of two or more of these organopolysiloxane. Note that $R^2$ in the formulas is an unsubstituted or halogen-substituted monovalent hydrocarbon group which has no aliphatic unsaturated carbon-carbon bond and has 1 to 12 carbon atoms, with examples thereof including the same groups as described above.

Moreover, while a viscosity of component (B) is not limited thereto, the kinematic viscosity at 25° C. is preferably within a range of 3 to 1,000 mm²/s, preferably within a range of 3 to 300 mm²/s, within a range of 3 to 100 mm²/s, or within a range of 3 to 50 mm²/s. This is because, if the viscosity of component (B) is at the lower limit of the abovementioned range or more, the volatility of component (B) decreases and the properties of the obtained cured product become stable; in contrast, if the viscosity is at the upper limit of the abovementioned range or less, the cured product is difficult to obtain. Note that the kinematic viscosity of component (B) at 25° C. can be measured by a Ubbelohde type viscometer in accordance with JIS Z8803.

A content of component (B) is an amount such that the amount of silicon atom-bonded hydrogen atoms provided by the present component is 0.5 mols or more and 20 mols or less with respect to 1 mol of the alkenyl groups in component (A), wherein the lower limit thereof is preferably 0.8 mols or more, 0.9 mols or more, or 1.5 mols or more, while the upper limit thereof is preferably 15 mols or less, 10 mols or less, or 5 mols or less. This is because, if the content of component (B) is the lower limit of the abovementioned range or more, a silicone adhesive layer having sufficient mechanical properties can be formed; in contrast, if the content is the upper limit of the abovementioned range or less, an increase in the adhesive force over time can be reduced with the obtained adhesive film attached to the adherend.

Note that while not limited thereto, a viscosity of the mixture of the abovementioned components (A) and (B) at 25° C. is preferably 10000 mPa·s or less because the wettability of the obtained adhesive film to the surface of the adherend is good and the adhesive force of the silicone adhesive layer is smaller.

A hydrosilylation reaction catalyst in component (C) is a catalyst for promoting curing of the abovementioned composition, with examples thereof including platinum based catalysts, palladium based catalysts, and rhodium based catalysts, with platinum based catalysts preferable. Examples of platinum based catalysts include chloroplatinic acid, alcohol solutions of chloroplatinic acid, carbonyl complexes of platinum, alkenyl siloxane complexes of platinum, and olefin complexes of platinum. In particular, alkenyl siloxane complexes of platinum are preferable in that the compatibility with component (A) is good. Examples of alkenyl siloxanes in this alkenyl siloxane complex of platinum include 1,3-divinyltetramethyldisiloxane and 1,1,3,3-tetravinyldimethyldisiloxane.

A content of component (C) is a sufficient amount to promote the hydrosilylation reaction of the abovementioned composition and is preferably an amount in which the catalyst metals in the present component are, in mass units, within a range of 0.1 to 1,000 ppm, within a range of 0.1 to 500 ppm, or within a range of 0.1 to 250 ppm, with respect to the abovementioned composition. This is because, if the content of component (C) is the abovementioned lower limit range or more, curing of the abovementioned composition is sufficiently promoted; in contrast, if the content is the abovementioned upper limit range or less, problems such as coloring of the obtained silicone adhesive layer are less likely to occur.

The abovementioned composition may comprise: (D) a reaction inhibitor in order to adjust the hydrosilylation reaction. Exemplary components (D) include alkyne alcohols such as 2-methyl-3-butyn-2-ol, 3,5-dimethyl-1-hexyn-3-ol, 3-methyl-1-penten-3-ol, 2-phenyl-3-butyn-2-ol, 1-ethynyl-1-cyclohexanol, 2-ethynylisopropanol, and 2-ethynylbutan-2-ol; silylated acetylene alcohols such as trimethyl(3,5-dimethyl-1-hexyn-3-oxy)silane, dimethyl bis (3-methyl-1-butynoxy)silane, methylvinyl bis(3-methyl-1-butyn-3-oxy)silane, and [(1,1-dimethyl-2-propynyl)oxy] trimethylsilane; enyne compounds such as 2-isobutyl-1-buten-3-yne, 3,5-dimethyl-3-hexen-1-yne, 3-methyl-3-penten-1-yne, 3-methyl-3-hexen-1-yne, 1-ethynylcyclohexene, 3-ethyl-3-buten-1-yne, and 3-phenyl-3-buten-1-yne; unsaturated carboxylic acid esters such as diallyl maleate, dimethyl maleate, diethyl fumarate, diallyl fumarate, bis-2-methoxy-1-methylethyl maleate, monooctyl maleate, monoisooctyl maleate, monoallyl maleate, monomethyl maleate, monoethyl fumarate, monoallyl fumarate, and 2-methoxy-1-methylethyl maleate; alkenylsiloxanes such as 1,3,5,7-tetramethyl-1,3,5,7-tetravinylcyclotetrasiloxane and 1,3,5,7-tetramethyl-1,3,5,7-tetrahexenylcyclotetrasiloxane; and benzotriazoles.

While not particularly limited thereto, a content of component (D) with respect to 100 parts by mass of components (A) and (B) is preferably 5 parts by mass or less or 3 parts by mass or less, while the lower limit thereof is 0.01 parts by mass or more or 0.1 parts by mass or more. This is because, if the content of component (D) is the lower limit of the abovementioned range or more, the usable time of a coating liquid can be ensured; in contrast, if the content is the upper limit of the abovementioned range or less, the composition can be cured at the normal curing temperature.

Moreover, as long as the abovementioned composition does not impair the object of the present invention, the composition may comprise: reinforcing silica such as fumed silica, precipitated silica, burned silica, crystalline silica, quartz powder, and diatomaceous earth; and those obtained by treating the surface of this reinforcing silica with organic silicon compounds such as methylchlorosilanes, dimethylpolysiloxane, and hexamethyldisilazane. While not limited thereto, the content of such reinforcing silica is, in terms of the handleability of the abovementioned composition, preferably 200 parts by mass or less, further preferably within a range of 3 to 150 parts by mass, with respect to 100 parts by mass of component (A).

Moreover, as long as the abovementioned composition does not impair the object of the present invention, the composition may comprise: aromatic hydrocarbon based solvents such as toluene and xylene; aliphatic hydrocarbon based solvents such as hexane, heptane, octane, isooctane, decane, cyclohexane, methylcyclohexane, and isoparaffin; hydrocarbon based solvents such as industrial gasoline, petroleum benzene, and solvent naphtha; ketone based solvents such as acetone, methyl ethyl ketone, 2-pentanone, 3-pentanone, 2-hexanone, 2-heptanone, 4-heptanone, methyl isobutyl ketone, diisobutyl ketone, acetonyl acetone, and cyclohexanone; ester based solvents such as ethyl acetate, propyl acetate, isopropyl acetate, butyl acetate, and isobutyl acetate; ether based solvents such as diethyl ether, dipropyl ether, diisopropyl ether, dibutyl ether, 1,2-dimethoxyethane, and 1,4-dioxane; solvents having ester groups and ether groups, such as 2-methoxyethylacetate, 2-ethoxyethylacetate, propylene glycol monomethylether acetate, and 2-butoxyethylacetate; siloxane based solvents such as hexamethyl disiloxane, octamethyl trisiloxane, octamethyl cyclotetrasiloxane, decamethyl cyclopentasiloxane, tris(trimethylsiloxy)methylsilane, and tetrakis(trimethylsiloxy)silane; mixed solvents thereof; non-reactive, branched, linear, or cyclic organosiloxanes; and cationic antistatic agents, anionic antistatic agents, amphoteric ionic antistatic agents, nonioic antistatic agents, and antistatic agents such as ion conductive polymers obtained by polymerizing or copolymerizing monomers having such cationic, anionic, amphoteric ionic ion conductive groups; in addition to plasticizers, age resistors, and coloring agents (pigments, dyes, etc.)

While not limited thereto, exemplary methods for coating the composition on the substrate film include gravure coating, offset coating, offset gravure, roll coating, reverse roll coating, air knife coating, curtain coating, and comma coating.

Next, the composition can be subjected to a hydrosilylation reaction at room temperature or by heating to form a silicone adhesive layer on the substrate film. This heating condition can be 15 seconds to 60 minutes at 60 to 180° C. Note that in order to sufficiently subject the composition to the hydrosilylation reaction, so-called step curing is preferably carried out in which the composition is heated from room temperature to 100° C., or heated from 60 to 80° C., and is then heated from 80 to 180° C., or heated from 100 to 180° C. to cure. Moreover, the heating temperature may be continuously increased in a continuous furnace, etc.

With the present adhesive film, while a thickness of the silicone adhesive layer is not limited, it is preferably within a range of 5 μm to 1000 μm.

In the present adhesive film, an elongation at break (tensile speed of 300 mm/min, temperature of 25° C.) of a silicone adhesive material forming the silicone adhesive layer specified in JIS K 6251 is 120 to 380%, while a shear storage modulus (frequency of 10 Hz, temperature of 25° C.) is $1.8 \times 10^5$ to $4.5 \times 10^5$ Pa.

The elongation at break of the silicone adhesive material specified in JIS K 6251 can be measured in accordance with the measurement of tensile properties specified in JIS K 6251, with the shape of the test piece being of a dumbbell shaped No. 3 type, having a tensile speed of 300 mm/min and a temperature of 25° C., and being within a range of 120 to 380%, wherein the lower limit thereof is preferably 180% or more or 250% or more, while the upper limit thereof is preferably 370% or less or 360% or less. This is because if the elongation at break is the lower limit of the abovementioned range or more, the silicone adhesive material exhibits sufficient tenacity, while if the adhesive film is cut, cutting waste tends not to occur; in contrast, if the elongation at break is the upper limit of the abovementioned range or less, the adhesive force is suppressed from increasing during high speed peeling.

Moreover, the shear storage modulus of the silicone adhesive material can be measured by viscoelasticity measurement with a ϕ8 mm parallel plate, a strain of 0.2%, a frequency of 10 Hz, a temperature of 25° C., and a sample thickness of 1 mm, and is within a range of $1.8 \times 10^5$ to $4.5 \times 10^5$ Pa, preferably within a range of $1.8 \times 10^5$ to $3.5 \times 10^5$ Pa, within a range of $2.0 \times 10^5$ to $3.5 \times 10^5$ Pa, or within a range of $2.2 \times 10^5$ to $3.5 \times 10^5$ Pa. This is because, if the storage modulus is at the lower limit of the abovementioned range or more, the adhesive force is suppressed from increasing during high speed peeling; in contrast, if the storage modulus is at the upper limit of the abovementioned range or less, the adhesive film has good wettability. Note that the shear storage modulus of this silicone adhesive material with a ϕ8 mm parallel plate, a strain of 0.2%, a frequency of 10 Hz, a temperature of −30° C., and a sample thickness of 1 mm is preferably within the range of $1.8 \times 10^5$ to $4.5 \times 10^5$ Pa.

Further, in the present adhesive film, when the substrate film is a PET film with a thickness of 50 μm and the thickness of the silicone adhesive layer is 40 μm, a 180° peeling adhesive force (peeling speed of 6 m/min, temperature of 25° C.) of the adhesive film to a mirror surface stainless steel plate specified in JIS Z 0237 is preferably within a range of 20 mN/25 mm to 60 mN/25 mm. This is because, if the 180° peeling adhesive force is the lower limit of the abovementioned range or more, the wettability of the adhesive film to the surface of the adherend is good; in contrast, if the 180° peeling adhesive force is the upper limit of the abovementioned range or less, the workability upon peeling the adhesive film attached from the adherend is good.

The present adhesive film can be used in various touch panels and flat panel displays (FPDs) for displaying characters, symbols, and images such as television receivers, computer monitors, monitors for portable information terminals, surveillance monitors, video cameras, digital cameras, mobile phones, portable information terminals, displays for instrument panels of automobiles or the like, displays for instrument panels of various equipment, devices, and instruments, automatic ticket machines, and automated teller machines. As a device, the present invention can be applied to display devices such as CRT displays, liquid crystal displays, plasma displays, organic EL displays, inorganic EL displays, LED displays, surface electrolytic displays (SEDs), and field emitting displays (FEDs), or touch panels utilizing the same. The adhesive film according to the present invention is used for the purpose of scratch prevention, stain prevention, fingerprint adhesion prevention, static prevention, reflection prevention, peep prevention, and the like of these display surfaces.

Furthermore, the present adhesive film is also suitable as a protective film for manufacturing various optical films, as well as for a protective film for manufacturing an electronic component. Examples thereof include: protecting and masking adhesive films upon processing optical components such as polarizing plates and light diffusion plates; heat-resistant masking tapes for use in processing of electronic components such as flexible printed circuit boards; etc.

EXAMPLES

The adhesive film according to the present invention will be described in further detail hereinafter using examples and comparative examples. Note that in the examples, viscosity is a value at 25° C.

<Viscosity>

The viscosity (mPa·s) is a value measured using a rotary viscometer in accordance with JIS K7117-1, while the kinematic viscosity (mm²/s) is a value measured with an Ubbelohde viscometer in accordance with JIS Z8803).

Examples 1 to 8 and Comparative Examples 1 to 4

In the examples and comparative examples, using the following components (A) to (D), silicone adhesives having the compositions indicated in Table 1 were prepared. Note that the content of component (B) is an amount such that the silicon atom-bonded hydrogen atoms are 3.0 mols with respect to 1 mol of the vinyl groups in component (A), the content of component (C) is an amount such that platinum atoms in a silicone adhesive are 40 ppm in mass units, and further, the content of component (D) is an amount of 0.2 mass % in the silicone adhesive.

The following components were used as component (A1) of component (A).

(a-1): a dimethylpolysiloxane end-blocked at both molecular chain terminals with dimethylvinylsiloxy groups and having a viscosity of 1,900 mPa·s (content of vinyl groups: 0.23 mass %)
(a-2): a dimethylpolysiloxane end-blocked at both molecular chain terminals with dimethylvinylsiloxy groups and having a viscosity of 350 mPa·s (content of vinyl groups: 0.49 mass %)
(a-3): a dimethylpolysiloxane end-blocked at both molecular chain terminals with dimethylvinylsiloxy groups and having a viscosity of 9,400 mPa·s (content of vinyl groups: 0.13 mass %)
(a-4): a dimethylpolysiloxane end-blocked at both molecular chain terminals with dimethylvinylsiloxy groups and having a viscosity of 40,000 mPa·s (content of vinyl groups: 0.09 mass %)
(a-5): a dimethylsiloxane-methylvinylsiloxane copolymer end-blocked at both molecular chain terminals with trimethylsiloxy groups and having a viscosity of 40,000 mPa·s (content of vinyl groups: 0.49 mass %)
(a-6): a dimethylsiloxane-methylvinylsiloxane copolymer end-blocked at both molecular chain terminals with trimethylsiloxy groups and having a viscosity of 7,000 mPa·s (content of vinyl groups: 0.30 mass %)
(a-7): a dimethylsiloxane-methylvinylsiloxane copolymer end-blocked at both molecular chain terminals with dimethylvinylsiloxy groups and having a viscosity of 14,000 mPa·s (content of vinyl groups: 0.79 mass %)

The following component was used as component (A2) of component (A).

(a-8): an organopolysiloxane represented by the average unit formula:

$[(CH_2\!=\!CH)(CH_3)_2SiO_{1/2}]_{0.05}[(CH_3)_3SiO_{1/2}]_{0.37}$
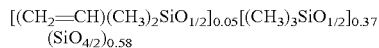
$(SiO_{4/2})_{0.58}$ The following component was used as component (B).
(b-1): an organopolysiloxane having a kinematic viscosity of 58 mm²/s and represented by the formula:

$(CH_3)_3SiO[(CH_3)HSiO]_{51}[(CH_3)_2SiO]_{23}Si(CH_3)_3$

The following component was used as component (C).
A 1,3-divinyl-1,1,3,3-tetramethyldisiloxane solution of a 1,3-divinyl-1,1,3,3-tetramethyldisiloxane complex of platinum (content of platinum atoms: approximately 5200 ppm).

The following component was used as component (D).
1-ethynylcyclohexan-1-ol

A cured product of this silicone adhesive was produced, after which the elongation thereof at break and the shear storage modulus thereof were measured, with the results thereof indicated in Table 1.

<Elongation at Break>

The silicone adhesive was cured at 70° C. for 10 minutes, and then at 120° C. for 20 minutes in order to produce a sheet having a thickness of 1 mm. A dumbbell shaped No. 3 type test piece specified in JIS K 6251 was produced from this sheet to measure the elongation at break at a tensile speed of 300 mm/min and a temperature of 25° C.

<Shear Storage Modulus>

A sample having a diameter of 8 mm was cut out from the abovementioned sheet. The shear storage modulus of this sample was measured using a dynamic viscoelasticity apparatus (MCR302 produced by Anoton Paar) under conditions of a φ8 mm parallel plate, a strain of 0.2%, a frequency of 10 Hz, and temperatures of 25° C. and −30° C.

Subsequently, this silicone adhesive was coated on a PET film (trade name: Lumilar S10 produced by Toray Industries, Inc.) with a thickness of 50 μm to produce a smooth coating surface, then cured at 120° C. for 3 minutes in order to produce an adhesive film having a silicone adhesive layer with a thickness of 40 μm. The wettability and 180° peeling adhesive force of this adhesive film were measured as follows, with the results thereof indicated in Table 1.

<Wettability of the Adhesive Film>

The adhesive film stored for one day at 25° C. was cut into a width of 25 mm and a length of 100 mm to produce a test piece. Using a mirror surface-processed stainless steel (SUS304), the state of this test piece was evaluated as follows by fixing one end of the width side to an adherend, lifting the end on the width side not fixed, releasing the hand therefrom, and pasting in place.
○: The test piece can be smoothly attached without creating air bubbles.
×: The air bubbles can be pushed out from above the film having air bubbles created.

<180° Peeling Adhesive Force>

The adhesive film stored at 25° C. for one day was cut into a width of 75 mm and a length of 150 mm to produce a test piece, after which a mirror surface-processed adherend made of stainless steel (SUS304) was pressure bonded using a 2 kgf rubber roller. Thereafter, the mixture was left to stand at 25° C. for one hour. Using a tensile tester at the peeling speed (6 m/min), the adhesive force thereof was measured by the 180° peeling method to determine the adhesive force (mN/25 mm). Moreover, in the case of the peeling speed (1 m/min), the 180° peeling adhesive force was also similarly measured.

TABLE 1

| | | | Segment Present Invention | | | |
|---|---|---|---|---|---|---|
| Items | | | 1 | 2 | 3 | 4 |
| Composition of component (A) in | (A1) | (a-1) | 35 | 35 | — | 51 |
| | | (a-2) | — | 20 | 40 | — |

TABLE 1-continued

| the silicone adhesive (mass %) | | (a-3) | 30 | — | — | 20 |
|---|---|---|---|---|---|---|
| | | (a-4) | — | — | — | — |
| | | (a-5) | — | 45 | 60 | 15 |
| | | (a-6) | — | — | — | — |
| | | (a-7) | 35 | — | — | — |
| | (A2) | (a-8) | — | — | — | 14 |
| Content of vinyl groups in component (A) (mass %) | | | 0.40 | 0.40 | 0.49 | 0.49 |
| Viscosity of the mixture of components (A) and (B) (mPa·s) | | | 6,580 | 7,540 | 8,640 | 4,640 |
| Properties of silicone adhesive material | Elongation at break (%) | | 215 | 240 | 160 | 350 |
| | Strength at break (MPa) | | 1.2 | 1.1 | 0.9 | 6.0 |
| | Shear storage modulus (×10$^5$ Pa) | 25° C. | 3.8 | 2.8 | 3.1 | 2.6 |
| | | −30° C. | 3.1 | 2.8 | 3.4 | 3.4 |
| Wettability of the adhesive film | | | ○ | ○ | ○ | ○ |
| 180° peeling adhesive force (mN/25 mm) | | 1 m/min | 6 | 4 | 5 | 8 |
| | | 6 m/min | 33 | 27 | 33 | 40 |

| | | | Segment Present Invention | | | |
|---|---|---|---|---|---|---|
| Items | | | 5 | 6 | 7 | 8 |
| Composition of component (A) in the silicone adhesive (mass %) | (A1) | (a-1) | — | 45 | 33 | 59 |
| | | (a-2) | 25 | — | — | — |
| | | (a-3) | — | 43 | 50 | — |
| | | (a-4) | — | — | — | — |
| | | (a-5) | 60 | — | — | 20 |
| | | (a-6) | 15 | — | — | — |
| | | (a-7) | — | — | — | 21 |
| | (A2) | (a-8) | — | 12 | 17 | — |
| Content of vinyl groups in component (A) (mass %) | | | 0.46 | 0.40 | 0.49 | 0.40 |
| Viscosity of the mixture of components (A) and (B) (mPa·s) | | | 4,640 | 4,240 | 4,720 | 6,480 |
| Properties of silicone adhesive material | Elongation at break (%) | | 340 | 350 | 300 | 210 |
| | Strength at break (MPa) | | 5.2 | 3.2 | 4.8 | 1.1 |
| | Shear storage modulus (×10$^5$ Pa) | 25° C. | 2.6 | 2.1 | 2.0 | 2.4 |
| | | −30° C. | 2.7 | 2.1 | 2.3 | 3.2 |
| Wettability of the adhesive film | | | ○ | ○ | ○ | ○ |
| 180° peeling adhesive force (mN/25 mm) | | 1 m/min | 7 | 12 | 7 | 6 |
| | | 6 m/min | 37 | 50 | 53 | 23 |

| | | | Segment Comparative Example | | | |
|---|---|---|---|---|---|---|
| Items | | | 1 | 2 | 3 | 4 |
| Composition of component (A) in the silicone adhesive (mass %) | (A1) | (a-1) | — | — | — | 59 |
| | | (a-2) | — | 50 | 25 | — |
| | | (a-3) | — | — | — | 10 |
| | | (a-4) | — | 50 | 75 | — |
| | | (a-5) | — | — | — | — |
| | | (a-6) | 60 | — | — | — |
| | | (a-7) | 40 | — | — | — |
| | (A2) | (a-8) | — | — | — | 31 |
| Content of vinyl groups in component (A) (mass %) | | | 0.50 | 0.29 | 0.19 | 0.77 |
| Viscosity of the mixture of components (A) and (B) (mPa·s) | | | 9,940 | 6,680 | 18,480 | 3,300 |
| Properties of silicone adhesive material | Elongation at cutting (%) | | 110 | 400 | 400 | 213 |
| | Strength at cutting (MPa) | | 0.7 | 1.1 | 0.7 | 11 |
| | Shear storage modulus (×10$^5$ Pa) | 25° C. | 3.9 | 1.1 | 1.6 | 4.9 |
| | | −30° C. | 4.0 | 1.1 | 2.0 | 9.7 |
| Wettability of the adhesive film | | | × | ○ | ○ | × |
| 180° peeling adhesive force (mN/25 mm) | | 1 m/min | 7 | 6 | 8 | 11 |
| | | 6 m/min | 10 | 67 | 70 | 23 |

INDUSTRIAL APPLICABILITY

The adhesive film according to the present invention has good wettability to the surface of the adherend and can be peeled with a small adhesive force during high speed peeling, allowing it to be suitably attached to flat panel displays and suitably attached for the purpose of protecting and masking upon processing optical members such as optical films along with electronic components such as printed circuit boards.

REFERENCE NUMERALS

1 Substrate film
2 Silicone adhesive layer

The invention claimed is:
1. An adhesive film comprising:
a substrate film; and
a silicone adhesive layer on at least one surface of the substrate film;
wherein the silicone adhesive layer is formed from a silicone adhesive material; and
wherein the silicone adhesive material has 120 to 380% of an elongation at break (tensile speed of 300 mm/min, temperature of 25° C.) specified in JIS K 6251, and 1.8×10$^5$ to 4.5×10$^5$ Pa of a shear storage modulus (frequency of 10 Hz, temperature of 25° C.).
2. The adhesive film according to claim 1, wherein a thickness of the silicone adhesive layer is 5 μm to 1000 μm.

3. The adhesive film according to claim 1, wherein, when the substrate film is a PET film with a thickness of 50 μm and the thickness of the silicone adhesive layer is 40 μm, the adhesive film has 20 mN/25 mm to 60 mN/25 mm of a 180° peeling adhesive force (peeling speed of 6 m/min, temperature of 25° C.) to a mirror surface stainless steel plate specified in JIS Z 0237.

4. The adhesive film according to claim 1, wherein the silicone adhesive material comprises:
(A) 100 parts by mass of an organopolysiloxane consisting of (A1) 100 to 80 mass % of a diorganopolysiloxane having at least two alkenyl groups per molecule and (A2) 0 to 20 mass % of an organopolysiloxane containing a-siloxane units represented by the formula $R^1_3SiO_{1/2}$ and $SiO_{4/2}$, wherein a molar ratio of $R^1_3SiO_{1/2}$ to $SiO_{4/2}$ siloxane units is 0.5 to 1.7, and wherein $R^1$ is the same or different unsubstituted or halogen substituted monovalent hydrocarbon group having 1 to 12 carbon atoms;

(B) an organohydrogenpolysiloxane having at least two silicon atom-bonded hydrogen atoms per molecule, in an amount such that the silicon atom-bonded hydrogen atoms are 0.5 to 20 mols with respect to 1 mol of the alkenyl groups in component (A); and (C) a catalytic amount of a hydrosilylation reaction catalyst.

5. The adhesive film according to claim 4, wherein a thickness of the silicone adhesive layer is 5 μm to 1000 μm.

6. The adhesive film according to claim 4, wherein, when the substrate film is a PET film with a thickness of 50 μm and the thickness of the silicone adhesive layer is 40 μm, the adhesive film has 20 mN/25 mm to 60 mN/25 mm of a 180° peeling adhesive force (peeling speed of 6 m/min, temperature of 25° C.) to a mirror surface stainless steel plate specified in JIS Z 0237.

* * * * *